(12) United States Patent
Mori et al.

(10) Patent No.: US 7,612,845 B2
(45) Date of Patent: Nov. 3, 2009

(54) POLARIZING PLATE WITH AN OPTICAL COMPENSATION LAYER, METHOD OF PRODUCING THE SAME, AND LIQUID CRYSTAL PANEL, LIQUID CRYSTAL DISPLAY APPARATUS, AND IMAGE DISPLAY APPARATUS, USING THE POLARIZING PLATE WITH AN OPTICAL COMPENSATION LAYER

(75) Inventors: Takuya Mori, Osaka (JP); Yoshitsugu Kitamura, Osaka (JP); Mariko Hirai, Osaka (JP); Naoki Takahashi, Osaka (JP)

(73) Assignee: Nitto Denko Corporation, Ibaraki-shi (JP)

( * ) Notice: Subject to any disclaimer, the term of this patent is extended or adjusted under 35 U.S.C. 154(b) by 166 days.

(21) Appl. No.: 11/995,402

(22) PCT Filed: Jul. 5, 2006

(86) PCT No.: PCT/JP2006/313413

§ 371 (c)(1),
(2), (4) Date: Jan. 11, 2008

(87) PCT Pub. No.: WO2007/007615

PCT Pub. Date: Jan. 18, 2007

(65) Prior Publication Data

US 2009/0128758 A1    May 21, 2009

(30) Foreign Application Priority Data

Jul. 13, 2005  (JP) .............................. 2005-203810

(51) Int. Cl.
*G02F 1/1335*    (2006.01)
*G02B 5/30*    (2006.01)

(52) U.S. Cl. .......................... 349/96; 349/118; 359/499

(58) Field of Classification Search ................... 349/96, 349/117, 118; 359/499
See application file for complete search history.

(56) References Cited

U.S. PATENT DOCUMENTS 5,506,706 A    4/1996    Yamahara et al.

(Continued)

FOREIGN PATENT DOCUMENTS

JP    6-75116 A    3/1994

(Continued)

OTHER PUBLICATIONS

International Search Report of PCT/JP2006/313413, date of mailing Oct. 17, 2006.

*Primary Examiner*—Mike Qi
(74) *Attorney, Agent, or Firm*—Westerman, Hattori, Daniels & Adrian, LLP

(57) ABSTRACT

There is provided a polarizing plate with optical compensation layers that contributes to reduction in thickness and has excellent heat resistance and moisture resistance. A polarizing plate with optical compensation layers according to an embodiment of the present invention includes: a polarizer; a first optical compensation layer;
a second optical compensation layer; and a third optical compensation layer, in this order. The first optical compensation layer has a refractive index profile of nx>ny=nz, and an in-plane retardation $Re_1$ of 200 to 300 nm; the second optical compensation layer has a refractive index profile of nx>ny=nz, and an in-plane retardation $Re_2$ of 80 to 170 nm; and the third optical compensation layer is formed of a material exhibiting an optical negative uniaxial property, and the material is aligned so as to be inclined.

14 Claims, 3 Drawing Sheets

U.S. PATENT DOCUMENTS

| | | | |
|---|---|---|---|
| 6,108,064 A | 8/2000 | Minoura et al. | |
| 6,762,811 B2 * | 7/2004 | Sasaki et al. | 349/118 |
| 6,791,640 B1 * | 9/2004 | Okamoto et al. | 349/113 |
| 7,079,204 B2 * | 7/2006 | Hata | 349/101 |
| 7,128,952 B2 * | 10/2006 | Murakami et al. | 428/1.3 |
| 7,443,473 B2 * | 10/2008 | Nagai | 349/117 |
| 2004/0227876 A1 | 11/2004 | Okumura | |
| 2007/0076152 A1 * | 4/2007 | Ito et al. | 349/117 |

FOREIGN PATENT DOCUMENTS

| | | |
|---|---|---|
| JP | 8-94838 A | 4/1996 |
| JP | 2002-365428 A | 12/2002 |
| JP | 2004-226758 A | 8/2004 |
| JP | 2004-258600 A | 9/2004 |
| JP | 2004-279566 A | 10/2004 |
| JP | 2004-309598 A | 11/2004 |
| JP | 2005-70097 A | 3/2005 |
| JP | 2005-139304 A | 6/2005 |

* cited by examiner

POLARIZING PLATE WITH AN OPTICAL COMPENSATION LAYER, METHOD OF PRODUCING THE SAME, AND LIQUID CRYSTAL PANEL, LIQUID CRYSTAL DISPLAY APPARATUS, AND IMAGE DISPLAY APPARATUS, USING THE POLARIZING PLATE WITH AN OPTICAL COMPENSATION LAYER

TECHNICAL FIELD

The present invention relates to a polarizing plate with optical compensation layers and a method of producing the same. More specifically, the present invention relates to a polarizing plate with optical compensation layers that contributes to reduction in thickness and has excellent heat resistance and moisture resistance, and a simple and inexpensive method of producing the same. The present invention also relates to a liquid crystal panel, a liquid crystal display apparatus, and an image display apparatus, using the polarizing plate with optical compensation layers.

BACKGROUND ART

Conventionally, polarizing plates have been widely used in liquid crystal display apparatuses, and the demand for the polarizing plates is rapidly increasing recently. Further, a polarizing plate with a high added value such as an elliptically polarizing plate provided with an optical compensation function in which at least one optical compensation layer is laminated on a polarizing plate has come into use, and there is an increasing demand for a display quality such as a high precision, high quality, and a wide viewing angle.

An optical compensation retardation film is known, in which an optical unisotropic layer containing an obliquely aligned discotic liquid crystal compound is supported by a triactate cellulose (TAC) film. Such a retardation film is directly laminated on a polarizer as a protective film having a wide viewing angle function, and is laminated on a polarizing plate to provide a wide viewing angle function (e.g., see Patent Documents 1 and 2).

However, when the above-mentioned retardation film is exposed to, for example, a high-temperature and high-humidity state, a TAC film that is a support base material may be distorted. As a result, a contract may be degraded.

Further, in the above-mentioned retardation film, an optical unisotropic layer itself is very thin, i.e., 10 μm or less, but the TAC film needs to have a thickness of about 100 μm so as to function as a support base material. Consequently, in the case of using such a retardation film, it is very difficult to make the film thin and light-weight.

Patent Document 1: JP 6-75116 A
Patent Document 2: JP 8-94838 A

DISCLOSURE OF THE INVENTION

Problems to be Solved by the Invention

The present invention has been made in view of solving the conventional problems as described above, and it is an object of the present invention to provide a polarizing plate with optical compensation layers that contributes to reduction in thickness and has excellent heat resistance and moisture resistance, and a simple and inexpensive method of producing the same. It is another object of the present invention to provide a liquid crystal panel, a liquid crystal display apparatus, and an image display apparatus, using the polarizing plate with optical compensation layers.

A polarizing plate with optical compensation layers according to an embodiment of the present invention includes: a polarizer; a first optical compensation layer; a second optical compensation layer; and a third optical compensation layer, in this order. The first optical compensation layer has a refractive index profile of nx>ny=nz, and an in-plane retardation $Re_1$ of 200 to 300 nm; the second optical compensation layer has a refractive index profile of nx>ny=nz, and an in-plane retardation $Re_2$ of 80 to 170 nm; and the third optical compensation layer is formed of a material exhibiting an optical negative uniaxial property, and the material is aligned so as to be inclined.

In one embodiment of the invention, the second optical compensation layer and the third optical compensation layer are attached to each other via only an adhesive layer.

In another embodiment of the invention, the third optical compensation layer has a thickness of 1 to 10 μm.

In still another embodiment of the invention, the first optical compensation layer and the second optical compensation layer respectively contains a norbornene-based resin and/or a polycarbonate-based resin.

In still another embodiment of the invention, the material exhibiting an optically negative uniaxial property comprises a discotic liquid crystal compound.

In still another embodiment of the invention, the material exhibiting an optically negative uniaxial property for the third optical compensation layer has an average optical axis inclined at an angle of 5° to 50° with respect to a normal line direction of the third optical compensation layer.

According to another aspect of the present invention, a liquid crystal panel is provided. The liquid crystal panel includes: the polarizing plate with optical compensation layers as described above; and a liquid crystal cell.

According to still another aspect of the present invention, a liquid crystal display apparatus is provided. The liquid crystal display apparatus includes the liquid crystal panel as described above.

According to still another aspect of the present invention, an image display apparatus is provided. The image display apparatus includes the polarizing plate with optical compensation layers as described above.

According to still another aspect of the present invention, a production method for a polarizing plate with optical compensation layers is provided. The method includes the steps of: preparing a laminate including an inclined alignment layer in which a material exhibiting an optically negative uniaxial property is aligned so as to be inclined, and a base material; attaching a second optical compensation layer having a refractive index profile of nx>ny=nz and an in-plane retardation $Re_2$ of 80 to 170 nm to the laminate such that the second optical compensation layer and the inclined alignment layer are adjacent to each other; peeling the base material, and setting the inclined alignment layer to be a third optical compensation layer; attaching a first optical compensation layer having a refractive index profile of nx>ny=nz and an in-plane retardation $Re_1$ of 200 to 300 nm; and attaching a polarizer.

In one embodiment of the invention, the step of attaching the second optical compensation layer to the laminate includes attaching the second optical compensation layer to the inclined alignment layer with an adhesive strength higher than an adhesive strength between the inclined alignment layer and the base material.

In another embodiment of the invention, the step of peeling the base material includes immersing the laminate in a water bath.

In still another embodiment of the invention, a temperature of the water bath is 50 to 100° C.

In still another embodiment of the invention, a time period of the immersing is 3 to 30 minutes.

Effects of the Present Invention

As described above, according to the present invention, by removing a TAC support base material from an inclined alignment layer formed of a material that exhibits an optically negative uniaxial property, adverse effects of the TAC support base material can be removed. Specifically, an extremely thin optical compensation layer can be realized, which can greatly contribute to the reduction in thickness of an image display apparatus. Further, the distortion of TAC in a high-temperature and high-humidity environment can be eliminated, so an elliptically polarizing plate with a wide viewing angle having very excellent durability (heat resistance and moisture resistance) is obtained.

Figure 1:
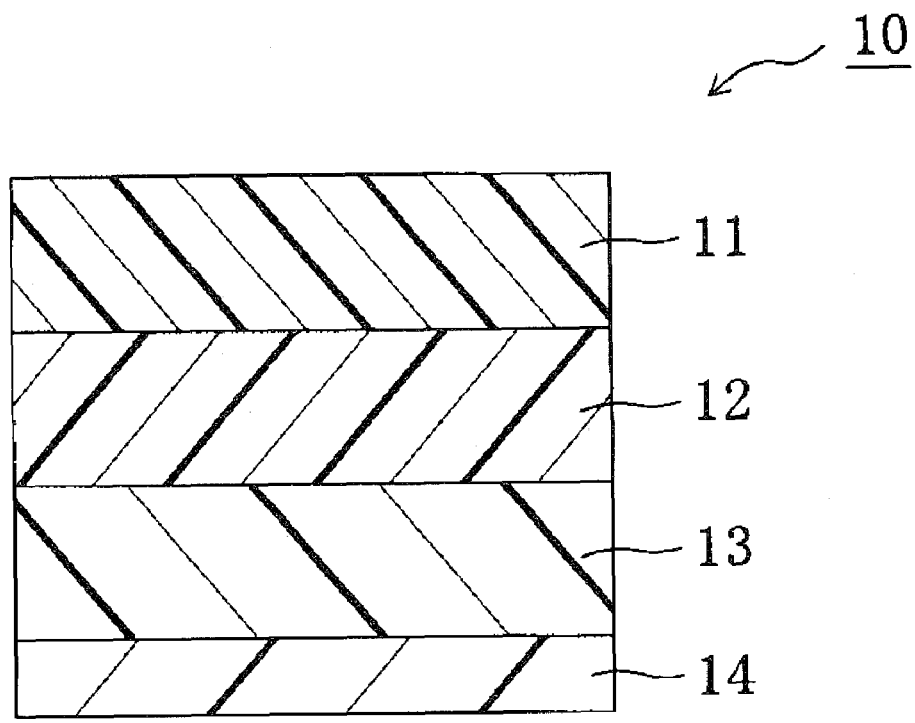
[FIG. 1] Schematic cross-sectional view of a polarizing plate with optical compensation layers according to a preferred embodiment of the present invention.

DESCRIPTION OF REFERENCE NUMERALS 10 polarizing plate with optical compensation layers
11 polarizer
12 first optical compensation layer
13 second optical compensation layer
14 third optical compensation layer
20 liquid crystal cell
100 liquid crystal panel

BEST MODE FOR CARRYING OUT THE INVENTION (Definitions of Terms and Symbols)

Definitions of terms and symbols in the present specification are described below.

(1) The symbol "nx" refers to a refractive index in a direction providing a maximum in-plane refractive index (that is, a slow axis direction), and the symbol "ny" refers to a refractive index in a direction perpendicular to the slow axis in the same plane (that is, a fast axis direction). The symbol "nz" refers to a refractive index in a thickness direction. Further, the expression "nx=ny", for example, not only refers to the case where nx and ny are exactly equal but also includes the case where nx and ny are substantially equal. In the present specification, the phrase "substantially equal" includes the case where nx and ny differ within a range providing no effects on overall optical properties of a polarizing plate with optical compensation layers in practical use.

(2) The term "in-plane retardation Re" refers to an in-plane retardation value of a film (layer) measured at 23° C. by using light of a wavelength of 590 nm. Re can be determined from an equation Re=(nx−ny)×d, where nx and ny represent refractive indices of a film (layer) at a wavelength of 590 nm in a slow axis direction and a fast axis direction, respectively, and d (nm) represents a thickness of the film (layer).

(3) The term "thickness direction retardation Rth" refers to a thickness direction retardation value measured at 23° C. by using light of a wavelength of 590 nm. Rth can be determined from an equation Rth=(nx−nz)×d, where nx and nz represent refractive indices of a film (layer) at a wavelength of 590 nm in a slow axis direction and a thickness direction, respectively, and d (nm) represents a thickness of the film (layer).

(4) The subscript "1" attached to a term or symbol described in the present specification represents a first optical compensation layer. The subscript "2" represents a second optical compensation layer. The subscript "3" represents a third optical compensation layer.

(5) The term "λ/2 plate" refers to a retardation plate having a function of converting linearly polarized light having a specific vibration direction into linearly polarized light having a vibration direction perpendicular thereto, or converting right-handed circularly polarized light into left-handed circularly polarized light (or converting left-handed circularly polarized light into right-handed circularly polarized light). A λ/2 plate provides an in-plane retardation value of approximately ½ with respect to a predetermined light wavelength (typically, visible light region).

(6) The term "λ/4 plate" refers to a retardation plate having a function of converting linearly polarized light having a specific wavelength into circularly polarized light (or converting circularly polarized light into linearly polarized light). λ/4 plate provides an in-plane retardation value of approximately ¼ with respect to a predetermined light wavelength (typically, visible light region).

(7) "Average optical axis" refers to a statistically average direction of each optical axis of molecules of a material exhibiting an optically negative uniaxial property in a third optical compensation layer.

A. Polarizing Plate with Optical Compensation Layers

A-1. Entire Configuration of a Polarizing Plate with Optical Compensation Layers FIG. 1 is a schematic cross-sectional view of a polarizing plate with optical compensation layers according to a preferred embodiment of the present invention. As shown in FIG. 1, a polarizing plate 10 with an optical compensation layer includes a polarizer 11, a first optical compensation layer 12, a second optical compensation layer 13, and a third optical compensation layer 14 in this order. Each layer of the polarizing plate with optical compensation layers is laminated via any appropriate pressure-sensitive adhesive layer or adhesive layer (not shown). Practically, any appropriate protective layer (not shown) is laminated on a side of the polarizer 11 where the optical compensation layer is not formed. Further, if required, a protective layer is provided between the polarizer 11 and the first optical compensation layer 12.

The first optical compensation layer 12 has a refractive index profile of nx>ny=nz, and an in-plane retardation $Re_1$ of 200 to 300 nm. The second optical compensation layer 13 has a refractive index profile of nx>ny=nz, and an in-plane retardation $Re_2$ of 80 to 170 nm. The third optical compensation layer 14 is formed of a material exhibiting an optically negative uniaxial property, and the material is aligned so as to be inclined in a thickness direction. The first optical compensation layer, the second optical compensation layer, and the third optical compensation layer will be described in detail in the following sections A-2, A-3, and A-4, respectively.

The entire thickness of the polarizing plate with optical compensation layers of the present invention is preferably 100 to 250 μm, more preferably 150 to 240 μm, and most preferably 160 to 230 μm. Conventionally, the inclined alignment layer of discotic liquid crystal is inevitably provided with a support base material (TAC film), and the support base material has a thickness of about 100 μm. Thus, in a configuration of a conventional elliptically polarizing plate with a wide viewing angle, the thickness of the third optical compensation layer mostly consists of the thickness of the support base material, and the thickness of about 100 μm is required for the third optical compensation layer. On the other hand, according to the present invention, the second optical compensation layer and the third optical compensation layer can be attached to each other via only an adhesive layer. In other words, according to the present invention, the third optical compensation layer as a single layer (i.e., without using as an intermediation a support base material such as a TAC film) of the inclined alignment layer of discotic liquid crystal, can be formed adjacent to the second optical compensation layer, and consequently, the third optical compensation layer can be made very thin (e.g., as thin as about 1 to 10 μm). Thus, the present invention can greatly contribute to reduction in thickness of an image display apparatus (e.g., a liquid crystal display apparatus).

A-2. First Optical Compensation Layer

The first optical compensation layer 12 may serve as a λ/2 plate. The first optical compensation layer serves as a λ/2 plate, to thereby appropriately adjust retardation of wavelength dispersion properties (in particular, a wavelength range in which the retardation departs from λ/4) of the second optical compensation layer serving as a λ/4 plate. The in-plane retardation $Re_1$ of the first optical compensation layer is 200 to 300 nm, preferably 220 to 280 nm, and more preferably 230 to 270 nm. Further, the first optical compensation layer 12 has a refractive index profile of nx>ny=nz.

A thickness of the first optical compensation layer may be set such that the first optical compensation layer may serve as a λ/2 plate most appropriately. That is, the thickness thereof may be set so as to provide a desired in-plane retardation. To be specific, the thickness is preferably 20 to 50 μm, more preferably 25 to 45 μm, and most preferably 25 to 40 μm.

Typical examples of the material forming the first optical compensation layer include: a polycarbonate-based resin; a general used olefin-based resin such as polypropyrene; polyester resins such as polyethylene terephthalate and polyethylene naphthalate; a cyclic olefin-based resin; cellulose-based resins such as hydroxyethyl cellulose, hydroxypropyl cellulose, methylcellulose, and polyacetyl cellulose; acrylic resins such as polyhydroxyethyl acrylate and polymethyl (meth)acrylate; a styrene-based resin; a polyvinyl alcohol; a polyvinylbutyral; polymethylvinyl ether; polyarylate; polysulfone; a sulfone-based resin such as polyethersulfone; polyphenylenesulfide; polyimide; polyvinyl chloride; copolymers thereof (e.g., a binaly copolymer, a ternaly copolymer, and a graft copolymer), and blends thereof.

As another typical example of the material for constituting the above first optical compensation layer, there is a nematic liquid crystalline compound. For example, by controlling the inclined alignment of a bar-shaped nematic liquid crystalline compound, a first optical compensation layer having desired properties can be formed. The inclined alignment state can be controlled by adjusting the kind and molecular structure of a liquid crystalline compound, the kind of an alignment film, and additives (e.g., a plasticizer, a binder, and a surfactant).

Among those materials, a cyclic olefin-based resin or a polycarbonate-based resin is particularly preferred. The cyclic olefin-based resin is a general term for a resin prepared through polymerization of a cyclic olefin as a monomer, and examples thereof include resins described in JP 1-240517 A, JP 3-14882 A, JP 3-122137 A, and the like. Specific examples thereof include: a ring opened (co)polymer of a cyclic olefin; an addition polymer of a cyclic olefin; a copolymer (typically, a random copolymer) of a cyclic olefin, and an α-olefin such as ethylene or propylene; their graft modified products each modified with an unsaturated carboxylic acid or its derivative; and hydrides thereof. A specific example of the cyclic olefin includes a norbornene-based monomer.

Examples of the norbornene-based monomer include: norbornene, its alkyl substitution and/or alkylidene substitution such as 5-methyl-2-norbornene, 5-dimethyl-2-norbornene, 5-ethyl-2-norbornene, 5-butyl-2-norbornene, 5-ethylidene-2-norbornene, and their products each substituted by a polar group such as halogen; dicyclopentadiene and 2,3-dihydrodicyclopentadiene; dimethano octahydronaphtalene, its alkyl substitution and/or alkylidene substitution, and their products each substituted by a polar group such as halogen, for example, 6-methyl-1,4:5,8-dimethano-1,4,4a,5,6,7,8,8a-octahydronaphtalene, 6-ethyl-1,4:5,8-dimethano-1,4,4a,5,6,7,8,8a-octahydronaphtalene, 6-ethylidene-1,4:5,8-dimethano-1,4,4a,5,6,7,8,8a-octahydronaphtalene, 6-chloro-1,4:5,8-dimethano-1,4,4a,5,6,7,8,8a-octahydronaphtalene, 6-cyano-1,4:5,8-dimethano-1,4,4a,5,6,7,8,8a-octahydronaphtalene, 6-pyridyl-1,4:5,8-dimethano-1,4,4a,5,6,7,8,8a-octahydronaphtalene, and 6-methoxycarbonyl-1,4:5,8-dimethano-1,4,4a,5,6,7,8,8a-octahydronaphtalene; and a trimer of cyclopentadiene and a tetramer of cyclopentadiene, for example, 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene.

In the present invention, other ring-opening polymerizable cycloolefins can be combined without impairing the purpose of the present invention. Specific example of such cycloolefin includes a compound having one reactive double-bond, for example, cyclopentene, cyclooctene, and 5,6-dihydrodicyclopentadiene.

The cyclic olefin-based resin has a number average molecular weight (Mn) of preferably 25,000 to 200,000, more preferably 30,000 to 100,000, and most preferably 40,000 to 80,000 measured through a gel permeation chromatography (GPC) method by using a toluene solvent. A number average molecular weight within the above ranges can provide a resin having excellent mechanical strength, and favorable solubility, forming property, and casting operability.

In the case where the cyclic olefin-based resin is prepared through hydrogenation of a ring opened polymer of a norbornene-based monomer, a hydrogenation rate is preferably 90% or more, more preferably 95% or more, and most preferably 99% or more. A hydrogenation rate within the above ranges can provide excellent heat degradation resistance, light degradation resistance, and the like.

For the cyclic olefin-based resin, various products are commercially available. Specific examples of the resin include the trade names "ZEONEX" and "ZEONOR" each manufactured by ZEON CORPORATION, the trade name "Arton" manufactured by JSR Corporation, the trade name "TOPAS" manufactured by TICONA Corporation, and the trade name "APEL" manufactured by Mitsui Chemicals, Inc.

Any appropriate polycarbonate-based resin is used as the above polycarbonate-based resin, as long as the effects of the present invention can be provided. For example, aromatic polycarbonate composed of an aromatic dihydric phenol component and a carbonate component is preferably used. Aromatic polycarbonate can generally be obtained through a reaction between an aromatic dihydric phenol compound and a carbonate precursor. That is, aromatic polycarbonate can be obtained through: a phosgene method in which phosgene is blown into an aromatic dihydric phenol compound in the presence of caustic alkali and a solvent; or an ester exchange method in which an aromatic dihydric phenol compound and bisarylcabonate are subjected to ester exchange in the presence of a catalyst. Specific examples of the carbonate precursor include: phosgene; bischloroformates of dihydric phenols; diphenyl carbonate; di-p-tolyl carbonate; phenyl-p-tolyl carbonate; di-p-chlorophenyl carbonate; and dinaphthyl carbonate. Of those, phosgene and diphenyl carbonate are preferred.

Specific examples of the aromatic dihydric phenol compound to react with the carbonate precursor include: 2,2-bis (4-hydroxyphenyl)propane; 2,2-bis(4-hydroxy-3,5-dimethylphenyl)propane; bis(4-hydroxyphenyl)methane; 1,1-bis(4-hydroxyphenyl)ethane; 2,2-bis(4-hydroxyphenyl)butane; 2,2-bis(4-hydroxy-3,5-dimethylphenyl)butane; 2,2-bis(4-hydroxy-3,5-dipropylphenyl)propane; 1,1-bis(4-hydroxyphenyl)cyclohexane; and 1,1-bis(4-hydroxyphenyl)-3,3,5-trimethylcyclohexane. Aromatic dihydric phenol compound may be used alone or in combination. Preferred examples thereof include: 2,2-bis(4-hydroxyphenyl)propane; 1,1-bis (4-hydroxyphenyl)cyclohexane; and 1,1-bis(4-hydroxyphenyl)-3,3,5-trimethylcyclohexane. Particularly preferably, 2,2-bis(4-hydroxyphenyl)propane and 1,1-bis(4-hydroxyphenyl)-3,3,5-trimethylcyclohexane are used in combination, to thereby provide a retardation film (as a result, a first optical compensation layer) having a sufficiently small photoelastic coefficient, and appropriate Tg and rigidity.

The polycarbonate-based resin has a weight average molecular weight (Mw) of preferably 25,000 to 200,000, more preferably 30,000 to 150,000, particularly preferably 40,000 to 100,000, and most preferably 50,000 to 80,000 in polystyrene equivalents measured through a GPC method in which tetrahydrofuran is used as a developing solvent. The polycarbonate-based resin having a weight average molecular weight within the above ranges can provide a retardation film (as a result, a first optical compensation layer) having excellent mechanical strength.

The first optical compensation layer 12 is preferably obtained by stretching (for example, uniaxial stretching in a plane direction) a film formed of the cyclic olefin-based resin or the polycarbonate-based resin. Any appropriate forming method may be employed as a method of forming a film from the cyclic olefin-based resin or the polycarbonate-based resin. Specific examples thereof include a compression molding method, a transfer molding method, an injection molding method, an extrusion molding method, a blow molding method, a powder molding method, an FRP molding method, and a casting method. The extrusion molding method and the casting method are preferred because a film to be obtained may have enhanced smoothness and favorable optical uniformity. Forming conditions may appropriately be set in accordance with the composition or type of resin to be used, properties desired for the first optical compensation layer, and the like. Many film products of the cyclic olefin-based resin and the polycarbonate-based resin are commercially available, and the commercially available films may be subjected to the stretching treatment.

A stretch ratio of the film may vary depending on the in-plane retardation value and thickness desired for the first optical compensation layer, the type of resin to be used, the thickness of the film to be used, the stretching temperature, and the like. To be specific, the stretch ratio is preferably 1.75 to 2.05 times, more preferably 1.80 to 2.00 times, and most preferably 1.85 to 1.95 times. Stretching at such a stretch ratio may provide a first optical compensation layer having an in-plane retardation which may appropriately exhibit the effect of the present invention.

A stretching temperature of the film may vary depending on the in-plane retardation value and thickness desired for the first optical compensation layer, the type of resin to be used, the thickness of the film to be used, the stretch ratio, and the like. To be specific, the stretching temperature is preferably 130 to 150° C., more preferably 135 to 145° C., and most preferably 137 to 143° C. Stretching at such a stretching temperature may provide a first optical compensation layer having an in-plane retardation which may appropriately exhibit the effect of the present invention.

Referring to FIG. 1, the first optical compensation layer 12 is arranged between the polarizer 11 and the second optical compensation layer 13. Any appropriate method may be employed as a method of arranging the first optical compensation layer in accordance with the purpose. Typically, the first optical compensation layer 12 is provided with a pressure-sensitive adhesive layer (not shown) on each side, and the first optical compensation layer 12 is bonded to the polarizer 11 and the second optical compensation layer 13. A gap between the layers is filled with the pressure-sensitive adhesive layer as described above, to thereby prevent shift in relationship among optical axes of the respective layers and abrasion among the layers causing damages when the polarizing plate with optical compensation layers is incorporated into an image display apparatus. Furthermore, reflection at the interface between the respective layers may be reduced, to thereby provide an image display apparatus having high contrast.

The thickness of the above pressure-sensitive adhesive layer can be appropriately set depending upon the purpose of use and the adhesive strength. Specifically, the thickness of the pressure-sensitive adhesive layer is preferably 1 μm to 100 μm, more preferably 5 μm to 50 μm, and most preferably 10 μm to 30 μm.

As the pressure-sensitive adhesive forming the above pressure-sensitive adhesive layer, any appropriate pressure-sensitive adhesive can be adopted. Specific examples thereof include a solvent-type pressure-sensitive adhesive, a non-aqueous emulsion-type pressure-sensitive adhesive, an aqueous pressure-sensitive adhesive, and a hot-melt pressure-sensitive adhesive. A solvent-type pressure-sensitive adhesive containing an acrylic polymer as a base polymer is preferably used. This is because such pressure-sensitive adhesive exhibits appropriate pressure-sensitive adhesive properties (wettability, cohesiveness, and adhesiveness) with respect to the polarizer and the first optical compensation layer, and has excellent optical transparency, weather resistance, and heat resistance.

An adhesive layer may be used in place of the above pressure-sensitive adhesive layer. As the adhesive forming the adhesive layer, there is typically a curable adhesive. Typical examples of the curable adhesive include a light-curable adhesive such as a UV-curable type adhesive, a moisture-curable adhesive, and a thermosetting adhesive. Specific examples of the thermosetting adhesive include thermosetting resin type adhesives such as an epoxy resin, an isocyanate resin, and a polyimide resin. A specific example of the moisture-curable adhesive include an isocyanate resin-based moisture-curable adhesive. The moisture-curable adhesive (in particular, an isocyanate resin-based moisture-curable adhesive) is preferred. The moisture-curable adhesive is cured by reacting with the moisture in the air or the adsorbed water on the surface of an adherend, or active hydrogen groups such as a hydroxyl group and a carboxyl group. Therefore, the adhesive can be cured naturally by being allowed to stand after applying, and thus, has excellent operability. As the above curable adhesive, for example, a commercially available adhesive may be used, or the above various kinds of curable resins may be dissolved or dispersed in a solvent to prepare a curable resin adhesive solution (or a dispersion).

A-3. Second Optical Compensation Layer

The second optical compensation layer 13 may serve as a $\lambda/4$ plate. According to the present invention, the wavelength dispersion properties of the second optical compensation layer serving as a $\lambda/4$ plate are corrected by optical characteristics of the first optical compensation layer serving as the $\lambda/2$ plate, to thereby exhibit a circularly polarizing function in a wide wavelength range. An in-plane retardation $Re_2$ of the second optical compensation layer is 80 to 170 nm, preferably 100 to 150 nm, and more preferably 110 to 140 nm. Further, the second optical compensation layer 13 has a refractive index profile of nx>ny=nz.

The thickness of the second optical compensation layer may be set such that the optical compensation layer may serve as a $\lambda/4$ plate most appropriately. That is, the thickness thereof may be set so as to provide a desired in-plane retardation. To be specific, the thickness thereof is preferably 30 to 60 μm, more preferably 35 to 55 μm, and most preferably 35 to 50 μm.

As the material for constituting the second optical compensation layer, the same material as that used in the first optical compensation layer is used. A cyclic olefin-based resin and a polycarbonate-based resin are preferred. The detail of the cyclic olefin-based resin and the polycarbonate-based resin has been described in the above section A-2.

The in-plane retardation $Re_2$ of the second optical compensation layer 13 can be controlled by changing the stretch ratio and the stretching temperature of the cyclic olefin-based resin film or the polycarbonate-based resin film described in the above section A-2. The stretch ratio can vary depending upon the in-plane retardation value and thickness desired in the second optical compensation layer, the kind of a resin to be used, the thickness of a film to be used, the stretching temperature, and the like. Specifically, the stretch ratio is preferably 1.17 to 1.47 times, more preferably 1.22 to 1.42 times, and most preferably 1.27 to 1.37 times. By stretching at such a stretch ratio, a second optical compensation layer having an in-plane retardation capable of exhibiting appropriately the effects of the present invention can be obtained.

The stretching temperature can vary depending upon the in-plane retardation value and the thickness desired in the second optical compensation layer, the kind of a resin to be used, the thickness of a film to be used, the stretch ratio, and the like. Specifically, the stretching temperature is preferably 130 to 150° C., more preferably 135 to 145° C., and most preferably 137 to 143° C. By stretching at such a temperature, a second optical compensation layer having an in-plane retardation capable of exhibiting appropriately the effects of the present invention can be obtained.

Referring to FIG. 1, the second optical compensation layer 13 is disposed between the first optical compensation layer 12 and the third optical compensation layer 14. As a method for placing the second optical compensation layer, any appropriate method can be adopted depending upon the purpose. Typically, the second optical compensation layer 13 is provided on both sides with pressure-sensitive adhesive layers (not shown), and the first optical compensation layer 12 and the third optical compensation layer 14 are attached to the second optical compensation layer 13. Adhesive layers may be used in place of the pressure-sensitive adhesive layers. Detail of the pressure-sensitive adhesive layer and the adhesive layer have been described in the above section A-2. In one embodiment, the third optical compensation layer 14 is attached to the second optical compensation layer 13 such that the side of an inclined alignment layer of discotic liquid crystal supported by a support base material of a laminate having the inclined alignment layer and the support base material is adjacent to the second optical compensation layer. At this time, preferably, the third optical compensation layer 14 is attached to the second optical compensation layer 13 such that the adhesive strength between the inclined alignment layer and the second optical compensation layer is higher than the adhesive strength between the inclined alignment layer and the support base material. By setting the adhesive strength between the inclined alignment layer and the second optical compensation layer to be higher than the adhesive strength between the inclined alignment layer and the support base material, the support base material can be peeled and removed appropriately without performing a particular treatment.

The adhesive strength between the above inclined alignment layer and the second optical compensation layer is measured, for example, with a tensile testing machine (AG-1, etc., manufactured by Shimadzu Corporation). Specifically, a laminate (width: 25 mm) in which the inclined alignment layer and the second optical compensation layer are attached to each other is fixed to an auxiliary plate, the second optical compensation layer is held with a lead tape, one end of the lead tape is fixed to a jig of the tensile testing machine, and the tensile strength is measured at a speed of 300±30 mm/min. and a 90° peel. The tensile strength at this time is set to be the adhesive strength between the inclined alignment layer and the second optical compensation layer. The adhesive strength between the inclined alignment layer and the support base material is similarly measured. The adhesive strength between the inclined alignment layer and the second optical compensation layer is appropriately set depending upon the purpose, and is preferably 10 to 30 N/25 mm and more preferably 15 to 25 N/25 mm. On the other hand, the adhesive strength between the inclined alignment layer and the support base material can be appropriately set depending upon the purpose. The adhesive strength between the inclined alignment layer and the support base material is preferably 0.5 to 4 N/25 mm, and more preferably 1 to 3 N/25 mm.

In a preferred embodiment, the third optical compensation layer 14 is attached to the second optical compensation layer 13 via an adhesive layer (in particular, a moisture-curable adhesive layer). The moisture-curable adhesive does not need to be heated for curing, so the third optical compensation layer is not heated during lamination (adhesion). Consequently, there is no fear of thermal shrink. Therefore, even in the case where the third optical compensation layer is very thin as in the present invention, the cracks and the like during lamination can be prevented remarkably. In addition, the curable adhesive hardly expands and shrinks even if it is heated after curing. Thus, even in the case where the third optical compensation layer is very thin, and a polarizing plate to be obtained is used under a high-temperature condition, the cracks and the like of the third optical compensation layer can be remarkably prevented.

A-4. Third Optical Compensation Layer

The third optical compensation layer 14 is formed of a material exhibiting an optically negative uniaxial property, and the material is aligned so as to be inclined in a thickness direction. The material that exhibits the optically negative uniaxial property refers to a material having a refractive index in which the refractive index of a major axis in one direction is smaller than the refractive indices in the other two directions. The material exhibiting the optically negative uniaxial property has, for example, a refractive index profile such as $nx=ny>nz$.

As a specific example of the material exhibiting the optically negative uniaxial property, there are a polyimide-based material and a liquid crystalline material such as a discotic liquid crystal compound. Further, a film that contains these materials as main components, and is immobilized under a condition that the material exhibiting a negative uniaxial property is aligned so as to be inclined by being mixed and reacted with another polymer or oligomer can also be used. The liquid crystalline material is preferred, and the discotic liquid crystal compound is particularly preferred. In the case of using the discotic liquid crystal compound, the inclined alignment state can be controlled by adjusting the kind and the molecular structure of a discotic liquid crystal compound, the kind of an alignment film, and additives (e.g., a plasticizer, a binder, and a surfactant).

The above discotic liquid crystal compound generally refers to a liquid crystalline compound having a disk-shaped molecular structure in which a main cyclic nucleus such as benzene, 1,3,5-triazine, or calixarene is placed at the center of molecules, and a straight-chain alkyl group, alkoxy group, a substituted benzoyloxy group, or the like substitutes for side chains in a radial manner. Typical examples of the discotic liquid crystal include: a benzene derivative, a triphenylene derivative, a toluxene derivative, and a phthalocyanine derivative described in the research report of C. Destrade et al., Mol. Cryst. Liq. Cryst. vol. 71, page 111 (1981); a cyclohexane derivative described in the research report of B. Kohne et al., Angew. Chem. vol. 96, page 70 (1984); and an azacrown-based or phenylacetylene-based macrocycle described in the research report of J. M. Lehn et al., J. Chem. Soc. Chem. Commun., page 1794 (1985) and the research report of J. Zhang et al., J. Am. Chem. Soc. vol. 116, page 2655 (1994).

The "inclined alignment" in this specification refers to the state in which molecules of a material (e.g., a discotic liquid crystal compound) exhibiting an optically negative uniaxial property in the third optical compensation layer are arranged so as to be inclined with respect to the plane of the optical compensation layer. Regarding the inclined alignment state, the inclination angle of the molecules may change in a thickness direction of the third optical compensation layer, or the inclination angle of molecules may be constant (tilt alignment) without changing in the thickness direction. In the present invention, it is preferred that an angle formed by the optical axis of the material exhibiting an optically negative uniaxial property and the normal direction of the third optical compensation layer (normal direction of the polarizing plate) increases toward the second optical compensation layer, and becomes maximum at an interface between the second optical compensation layer and the third optical compensation layer.

The average optical axis of the material exhibiting an optically negative uniaxial property in the third optical compensation layer is inclined at an angle of preferably 5° to 50°, more preferably 10° to 30°, and most preferably 15° to 25° with respect to the normal direction of the third optical compensation layer. By controlling the inclination angle to be 5° or more, the effect of enlarging a viewing angle is large in the case where the polarizing plate with optical compensation layers is mounted to a liquid crystal display apparatus or the like. By controlling the inclination angle to be 50° or less, the viewing angle properties become satisfactory in any of four directions of upper, lower, right, and left directions, whereby the viewing angle properties can be prevented from becoming satisfactory or unsatisfactory depending upon the viewing direction.

The in-plane retardation $Re_3$ of the above third optical compensation layer is preferably 0 to 200 nm, and more preferably 1 to 150 nm. Further, the retardation $Rth_3$ in the thickness direction is preferably 10 to 400 nm, and more preferably 50 to 300 nm.

The thickness of the third optical compensation layer is not particularly limited, but can be preferably 1 to 10 μm, and more preferably 2 to 7 μm in the present invention. Realizing such a very thin optical compensation layer using an inclined alignment layer of a material (e.g., a discotic liquid crystal) exhibiting an optically negative uniaxial property is one of the significant features of the present invention.

A-5. Polarizer

Any suitable polarizer may be employed as the polarizer 11 in accordance with the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based orientation film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred because of high polarized dichromaticity. A thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination or an antiblocking agent on a film surface, but also provides an effect of preventing nonuniformity such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

A-6. Protective Layer

Any suitable film which can be used as a protective layer for a polarizing plate may be employed as the protective layer. Specific examples of a material used as a main component of the film include transparent resins such as a cellulose-based resin (such as triacetylcellulose (TAC)), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, an acrylic resin, and an acetate-based resin. Another example thereof includes an acrylic, urethane-based, acrylic urethane-based, epoxy-based, or silicone-based thermosetting resin or UV-curing resin. Still another example thereof includes a glassy polymer such as a siloxane-based polymer. Further, a polymer film described in JP 2001-343529 A (WO 01/37007) may also be used. More specifically, the film in the publication is formed of a resin composition containing a thermoplastic resin having a substituted or unsubstituted imide group on a side chain, and a thermoplastic resin having a substituted or unsubstituted phenyl group and a nitrile group on a side chain. A specific example thereof includes a resin composition containing an alternate copolymer of isobutene and N-methylmaleimide, and an acrylonitrile/styrene copolymer. The polymer film may be an extruded product of the above-mentioned resin composition, for example. Of those, TAC, a polyimide-based resin, a polyvinyl alcohol-based resin and a glassy polymer are preferred. TAC is especially preferred.

It is preferred that the protective layer be transparent and have no color. More specifically, the protective layer has a thickness direction retardation of preferably −90 nm to +90 nm, more preferably −80 nm to +80 nm, and most preferably −70 nm to +70 nm.

The protective layer has any suitable thickness as long as the preferred thickness direction retardation can be obtained. More specifically, the thickness of the protective layer is preferably 5 mm or less, more preferably 1 mm or less, especially preferably 1 to 500 μm, and most preferably 5 to 150 μm.

The surface of the protective layer arranged at the outer side of the polarizer 11 (that is, the opposite side with respect to the optical compensation layers) may be subjected to hard coat treatment, antireflection treatment, anti-sticking treatment, anti-glare treatment, or the like as required.

A-7. Other Components of Polarizing Plate

The polarizing plate with optical compensation layers of the present invention may further include another optical layer. Any suitable optical layers may be employed as the other optical layer in accordance with the purpose or the type of an image display apparatus. Specific examples of the other optical layer include a liquid crystal film, a light scattering film, a diffraction film and other optical compensation layer (retardation film).

The polarizing plate with optical compensation layers of the present invention can further have a pressure-sensitive adhesive layer or an adhesive layer as an outermost layer on at least one side. Owing to the presence of the pressure-sensitive adhesive layer or the adhesive layer as an outermost layer, for example, the lamination with another member (e.g., a liquid crystal cell) is easily performed, which can prevent the polarizing plate from peeling from the another member. As the material for the above pressure-sensitive adhesive, any appropriate material can be adopted. Specific examples of the pressure-sensitive adhesive include those described in the above section A-2. Specific examples of the adhesive include those described in the above section A-3. Preferably, a material having excellent moisture absorbing property and heat resistance is used. This is because such a material can prevent bubbling and peeling due to the absorption of a moisture, the degradation in optical properties due to the thermal expansion difference and the like, the warpage of a liquid crystal cell, and the like.

Practically, the surface of the above pressure-sensitive adhesive layer or adhesive layer is covered with any appropriate separator until the polarizing plate is actually used, thereby being prevented from contamination. The separator can be formed, for example, by a method of providing a release coat of a release agent such as silicone, long-chain alkyl, fluorine, molybdenum sulfide, or the like to any appropriate film, as required.

Each layer in the polarizing plate with optical compensation layers of the present invention may be provided with a UV-absorbing ability, for example, by a treatment with a UV-absorber such as an salicylic acid ester-based compound, a benzophenone-based compound, a benzotriazole-based compound, a cyanoacrylate-based compound, or a nickel complex salt-based compound.

B. Method of Producing a Polarizing Plate with Optical Compensation Layers

A preferred example of a method of producing a polarizing plate with optical compensation layers of the present invention will be described. First, a laminate having, a layer (inclined alignment layer) in which a material exhibiting an optically negative uniaxial property is aligned so as to be inclined and a base material is prepared. Such a laminate can be obtained by applying a solution (applying liquid), in which the material is dissolved in an appropriate solvent in a predetermined concentration, to a base material, followed by drying (for example, heat treatment). The kind of a solvent, the concentration of a solution, an applying amount, an applying method, and the like can be set appropriately depending upon the purpose, a desired thickness or optical properties of the third optical compensation layer, a desired inclination angle of the material, and the like. The applying liquid can contain any appropriate additive (e.g., a plasticizer, a binder, and a surfactant). By adjusting the kinds and/or the adding amounts of the additives, the inclination alignment state of the material exhibiting an optically negative uniaxial property can be controlled. Further, the applying liquid can further contain any appropriate polymer and/or oligomer. By allowing such a polymer and/or oligomer to react with the material exhibiting an optically negative uniaxial property, the inclination alignment state of the material can be fixed. The base material is typically a TAC film.

Alternatively, as the above laminate, a commercially available laminate film may be used. A typical example of the commercially available laminate film includes WVSA12B (a complex film having an inclined alignment layer of a discotic liquid crystal compound on a TAC support base material) manufactured by FUJIFILM Corporation.

Next, an inclined alignment layer (which is to be the third optical compensation layer finally) of the above laminate and a film for the second optical compensation layer are attached to each other via an adhesive layer or a pressure-sensitive adhesive layer (preferably, an adhesive layer). In one embodiment, the inclined alignment layer of the above laminate is attached to the second optical compensation layer such that the adhesive strength between the inclined alignment layer and the second optical compensation layer is higher than that between the inclined alignment layer and the support base material.

Next, the base material is peeled from the laminate obtained by the above attachment. Any appropriate peeling method can be adopted as long as the base material is peeled appropriately. Typically, by setting the adhesive strength between the inclined alignment layer and the second optical compensation layer to be higher than that between the inclined alignment layer and the support base material, the inclined alignment layer and the support base material can be satisfactorily peeled without performing any special treatment, and the support base material can be removed. Thus, by setting the adhesive strength between the inclined alignment layer and the second optical compensation layer to be higher than that between the inclined alignment layer and the support base material, the base material can be satisfactorily peeled without adversely affecting the inclined alignment layer (the third optical compensation layer).

In another preferred embodiment, for example, there is a method of immersing a laminate in a hot water bath. The immersing temperature (temperature of the hot water bath) and the immersing time can be set in an appropriate combination. Generally, the immersing time can be shortened when the immersing temperature is raised. Specifically, the immersing temperature is preferably 50° C. to 100° C., more preferably 60° C. to 90° C., and most preferably 70° C. to 90° C. When the immersing temperature is 70° C., the immersing time is preferably 7 to 30 minutes, more preferably 7 to 20 minutes, and most preferably 7 to 15 minutes. When the immersing temperature is 80° C. to 90° C., the immersing time is preferably 3 to 30 minutes, more preferably 3 to 20 minutes, and most preferably 3 to 15 minutes. With the treatment at such a immersing temperature and immersing time, a base material can be satisfactorily peeled without adversely affecting the inclined alignment layer (third optical compensation layer).

On the second optical compensation layer side of the laminate (laminate of the second optical compensation layer and the third optical compensation layer) thus obtained, the first optical compensation layer and the polarizer are laminated. As long as the elliptically polarizing plate having the configuration as shown in FIG. 1 is obtained, and as long as the polarizer is not immersed in, for example, a hot water bath, the lamination order and lamination timing can be appropriately set. For example, the first optical compensation layer and the polarizer may be laminated successively on the laminate of the second optical compensation layer and the third optical compensation layer, or the laminate of the first optical compensation layer and the polarizer may be laminated on the laminate of the second optical compensation layer and the third optical compensation layer. Alternatively, after the laminate of the first optical compensation layer, the second optical compensation layer, and the third optical compensation layer (base material/inclined alignment layer) is produced, the base material is peeled, and thereafter, the polarizer may be laminated. Note that the polarizer may be a polarizing plate having a protective layer at least on one surface thereof.

As described above, the polarizing plate with optical compensation layers of the present invention is obtained.

C. Application Purpose of the Polarizing Plate with Optical Compensation Layers

The polarizing plate with optical compensation layers of the present invention can be preferably used for various kinds of image display apparatuses (e.g., a liquid crystal display apparatus, and a self-luminous display apparatus). Specific examples of the applicable image display apparatus include a liquid crystal display apparatus, an EL display, a plasma display (PD), and a field emission display (FED). The use of the polarizing plate with optical compensation layers of the present invention for a liquid crystal display apparatus is useful for, for example, preventing light leakage in a black display and compensating for a viewing angle. The polarizing plate with optical compensation layers of the present invention can be used for a liquid crystal display apparatus of any appropriate driving mode. Specifically, the polarizing plate with optical compensation layers of the present invention is preferably used for liquid crystal display apparatuses of a VA mode, an OCB mode, an ECB mode, a TN mode and the like. The polarizing plate with optical compensation layers of the present invention is used more preferably for a liquid crystal display apparatus of a VA mode, and is particularly preferably used for a liquid crystal display apparatus of a VA mode of a reflection type and a semi-transmission type. Further, the use of the polarizing plate with optical compensation layers of the present invention for an EL display is useful for, for example, preventing electrode reflection.

D. Image Display Apparatus

Figure 2:
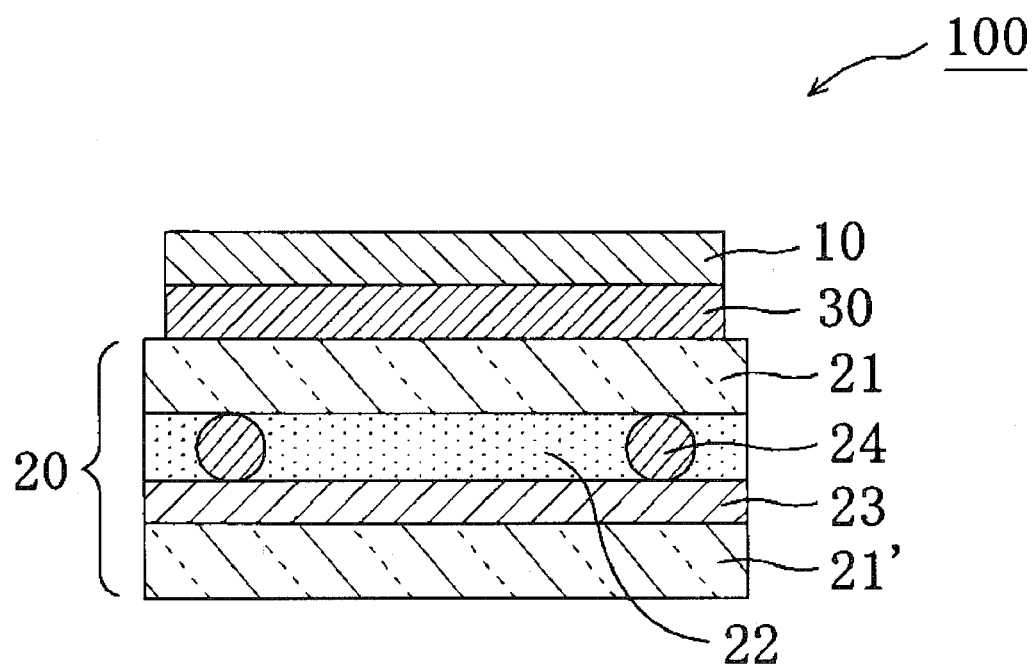
[FIG. 2] Schematic cross-sectional view of a liquid crystal panel used for a liquid crystal display apparatus according to a preferred embodiment of the present invention.

As an example of the image display apparatus of the present invention, a liquid crystal display apparatus will be described. Herein, a liquid crystal panel used in a liquid crystal display apparatus will be described. Regarding the other configurations of the liquid crystal display apparatus, any appropriate configuration can be adopted depending upon the purpose. In the present invention, a liquid crystal display apparatus of a VA mode, an OCB mode, an ECB mode, or a TN mode is preferred, a liquid crystal display apparatus of a VA mode is more preferred, and a reflection-type or semi-transmission-type liquid crystal display apparatus of a VA mode is particularly preferred. FIG. 2 shows a schematic cross-sectional view of a liquid crystal display apparatus of a VA mode as an example of a liquid crystal panel according to a preferred embodiment of the present invention. Herein, as an example, a reflection-type liquid crystal panel for a liquid crystal display apparatus will be described. A liquid crystal panel 100 includes a liquid crystal cell 20, a retardation plate 30 disposed on an upper side of the liquid crystal cell 20, and a polarizing plate 10 placed on an upper side of the retardation plate 30. As the retardation plate 30, any appropriate retardation plate can be adopted depending upon the purpose and the alignment mode of a liquid crystal cell. The retardation plate 30 can be omitted depending upon the purpose and the alignment mode of a liquid crystal cell. The above polarizing plate 10 is the polarizing plate with optical compensation layers according to the present invention descried in the above sections A and B. The liquid crystal cell 20 has a pair of glass substrates 21, 21' and a liquid crystal layer 22 serving as a display medium disposed between the substrates. A reflective electrode 23 is provided on the liquid crystal layer 22 side of the lower substrate 21'. On the upper substrate 21, a color filter (not shown) is provided. An interval (cell gap) between the substrates 21, 21' is controlled with spacers 24.

For example, in the case where the liquid crystal display apparatus (liquid crystal panel) 100 is a reflection-type VA mode, liquid crystal molecules are aligned perpendicularly to the surfaces of the substrates 21, 21' under no voltage application. Such homeotropic alignment can be realized by aligning nematic liquid crystal having negative dielectric unisotropy between substrates with homeotropic alignment films (not shown) formed thereon. When linearly polarized light having passed through the polarizing plate 10 is incident upon the liquid crystal layer 22 from the surface of the upper substrate 21, incident light travels along a major axis direction of liquid crystal molecules perpendicularly aligned. In the major axis direction of liquid crystal molecules, incident light travels without changing a polarization direction since birefringence does not occur, is reflected by the reflective electrode 23 to pass through the liquid crystal layer 22 again, and is output from the upper substrate 21. Since the polarization state of output light does not change from that at a time of incidence, the output light passes through the polarizing plate 10, whereby a display in a bright state is obtained. When a voltage is applied between the electrodes, the major axes of liquid crystal molecules are aligned horizontally to the substrate surfaces. The liquid crystal molecules exhibit birefringence with respect to the linearly polarized light incident upon the liquid crystal layer 22 in this state, and the polarization state of incident light changes depending upon the tilt of the liquid crystal molecules. Under application of a predetermined maximum voltage, light reflected by the reflective electrode 23 and output from the upper substrate becomes, for example, linearly polarized light with a polarization direction rotated by 90° and is absorbed by the polarizing plate 10, whereby a display in a dark state is obtained. When a state of voltage application is returned to the state of no application of a voltage again, the display in a dark state can be returned to the display in a light state with an alignment restraining force. Further, a gray-scale display can be performed by changing the applied voltage to control the tilt of the liquid crystal molecules, thereby changing the intensity of transmitted light from the polarizing plate 10. As described above, the image display apparatus of the present invention is not limited to a reflection-type liquid crystal display apparatus of a VA mode, and can also be applied to a liquid crystal display apparatus of any appropriate driving mode (e.g., an OCB mode, an ECB mode, and a TN mode), or another image display apparatus (e.g., an EL display, a plasma display (PD), and a field effect display (FED)).

Hereinafter, the present invention is described more specifically by way of examples. However, the present invention is not limited to the examples.

EXAMPLE 1

(Production of Polarizer)

A commercially available polyvinyl alcohol (PVA) film (available from Kuraray Co., Ltd.) was colored in an aqueous solution containing iodine and uniaxially stretched to about a 6 times length between rolls having different speed ratios in an aqueous solution containing boric acid, to thereby obtain a continuous polarizer. A commercially available TAC film (available from Fuji Photo Film Co., Ltd.) was attached to both sides of the polarizer by using a PVA-based adhesive, to thereby obtain a polarizing plate (protective layer/polarizer/protective layer) having an entire thickness of 100 μm. This polarizing plate was punched out into a size of 20 cm length and 30 cm width. At this time, an absorption axis of the polarizer is arranged in the length direction.

(Production of First Optical Compensation Layer)

A continuous norbornene-based resin film (trade name, Zeonor, available from Zeon Corporation, thickness of 60 μm, photoelastic coefficient of $3.10 \times 10^{-12}$ m$^2$/N) was uniaxially stretched to a 1.90 times length at 140° C., to thereby produce a continuous film for a first optical compensation layer. This film had a thickness of 35 μm, and an in-plane retardation Re$_1$ of 270 nm. This film was punched out into a size of 20 cm length and 30 cm width. At this time, a slow axis of the film is arranged in the length direction.

(Production of Second Optical Compensation Layer)

A continuous norbornene-based resin film (trade name, Zeonor, available from Zeon Corporation, thickness of 60 μm, photoelastic coefficient of $3.10 \times 10^{-12}$ m$^2$/N) was uniaxially stretched to a 1.32 times length at 140° C., to thereby produce a continuous film for a second optical compensation layer. This film had a thickness of 40 μm, and an in-plane retardation Re$_1$ of 140 nm. This film was punched out into a size of 20 cm length and 30 cm width. At this time, a slow axis of the film is arranged in the length direction.

(Production of Third Optical Compensation Layer)

As a film for the third optical compensation layer, a complex film (WVSA12B (thickness: 110 μm) manufactured by FUJIFILM Corporation) having a support base material and a liquid crystal layer was used. The complex film had an inclined alignment layer of discotic liquid crystal on a TAC support base material. The in-plane retardation Re$_3$ of the complex film was 30 nm, the thickness direction retardation Rth$_3$ was 160 nm, and the inclination angle of an average optical axis was 20°.

The liquid crystal layer of the complex film and the above second optical compensation layer were attached to each other with an isocyanate-based curable adhesive (thickness: 5 μm) to obtain a laminate A. At this time, the adhesive strength between the liquid crystal layer and the second optical compensation layer and the adhesive strength between the liquid crystal layer and the support base material were measured. As a result, the adhesive strength between the liquid crystal layer and the second optical compensation layer was 20 N/25 mm, and the adhesive strength between the liquid crystal layer and the support base material was 1.3 N/25 mm. That is, the adhesion was conducted under the condition that the adhesive strength between the liquid crystal layer and the second optical compensation layer was higher than that between the liquid crystal layer and the support base material. The adhesive strength was measured as follows. First, the laminate A (width: 25 mm) was fixed to an auxiliary plate, the second optical compensation layer was held with a lead tape, and one end of the lead tape was fixed to a jig of a tensile testing machine (AG-1 manufactured by Shimadzu Corporation). Next, the adhesive strength between the liquid crystal layer and the second optical compensation layer was measured at a speed of 300 mm/min. and a 90° peel. The adhesive strength between the liquid crystal layer (inclined alignment layer) and the support base material was similarly measured. Thus, the liquid crystal layer and the second optical compensation layer were attached to each other under the condition that the adhesive strength between the liquid crystal layer and the second optical compensation layer was higher than that between the liquid crystal layer and the support base material. Thus, the support base material was appropriately peeled and removed without performing any particular treatment, whereby a laminate B1 having the liquid crystal layer (inclined alignment layer of discotic liquid crystal) and the second optical compensation layer was obtained. The liquid crystal layer was set to be the third optical compensation layer, and the thickness thereof was 3 μm. The angle formed by the optical axis of discotic liquid crystal and the normal line of the third optical compensation layer was maximum on the second optical compensation layer side.

(Production of Polarizing Plate with Optical Compensation Layers)

The first optical compensation layer and the polarizing plate were laminated in this order on a surface of the second optical compensation layer opposite to a side where the third optical compensation layer was attached. The polarizing plate and the first optical compensation layer, and the first optical compensation layer and the second optical compensation layer were attached to each other via an acrylic pressure-sensitive adhesive layer (thickness: 20 μm), respectively. Thus, a polarizing plate with optical compensation layers with an entire thickness of 223 μm was produced.

EXAMPLE 2

The laminate A obtained in Example 1 was immersed in a hot water bath at 90° C. for 5 minutes to peel and remove the TAC support base material, whereby a laminate B2 having a liquid crystal layer (inclined alignment layer of discotic liquid crystal) and a second optical compensation layer was obtained. The liquid crystal layer was set to be a third optical compensation layer. The thickness of the third optical compensation layer was 3 μm. The angle formed by the optical axis of the discotic liquid crystal and the normal line of the third optical compensation layer was maximum on the second optical compensation layer side. A polarizing plate with optical compensation layers having an entire thickness of 223 μm was produced in the same way as in Example 1, except for using the obtained laminate B2.

COMPARATIVE EXAMPLE 1

A polarizing plate with optical compensation layers having an entire thickness of 330 μm was produced in the same way as in Example 1, except that the TAC support base material was not removed.

(Viewing Angle Properties)

Figure 3A:
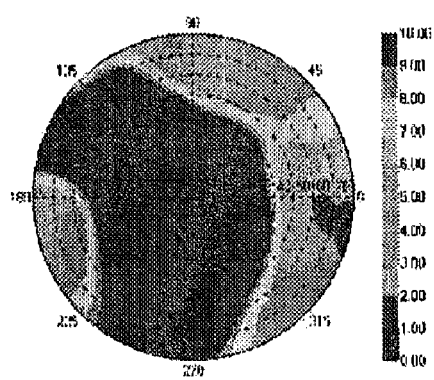
[FIG. 3(a)] A contour map showing a viewing angle dependence of a liquid crystal panel using a polarizing plate with optical compensation layers according to an example of the present invention.
Figure 3B:
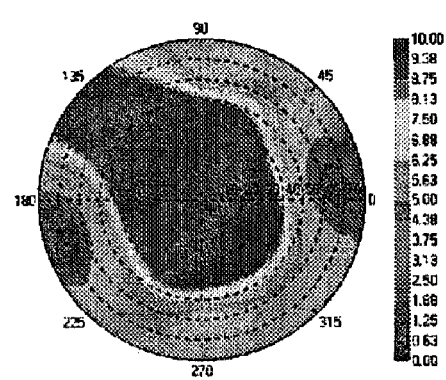
[FIG. 3(b)] A contour map showing a viewing angle dependence of a liquid crystal panel using a polarizing plate with optical compensation layers according to a comparative example.

The polarizing plate with optical compensation layers of Example 1 or Comparative Example 1 obtained as described above was mounted on a backlight side of a liquid crystal cell manufactured by Hitachi, Ltd. such that the third optical compensation layer was disposed on the liquid crystal cell side. On a viewer side of the liquid crystal cell, a polarizing plate with optical compensation layers having the configuration of polarizing plate/first optical compensation layer/second optical compensation layer (all of which were those described in Examples) was mounted such that the second optical compensation layer was disposed on the liquid crystal cell side. The liquid crystal cell having the polarizing plates with optical compensation layers mounted thereon was measured for viewing angle properties, using a viewing angle property measurement apparatus (EZ Contrast manufactured by ELDIM). FIGS. 3(a) and 3(b) respectively show a contour map of a contrast of Example 1 and Comparative Example 1.

As is apparent from FIGS. 3(a) and 3(b), it is confirmed that the liquid crystal cell using the polarizing plate with optical compensation layers of Example 1 had a remarkably wider viewing angle than that of the liquid crystal cell using the polarizing plate with optical compensation layers of Comparative Example 1. The reason for this is assumed as follows. The polarizing plate with optical compensation layers of Example 1 was not influenced by a retardation value of the TAC support base material since the TAC support base material was removed from the third optical compensation layer, so the polarizing plate with optical compensation layers of Example 1 had a wider viewing angle. On the other hand, the polarizing plate with optical compensation layers of Comparative Example 1 was largely influenced by a retardation value of the TAC support base material, so the polarizing plate with optical compensation layers of Comparative Example 1 had a narrower viewing angle. Although not shown in the drawings, the viewing angle properties in Example 2 were also substantially the same as those in Example 1, and had a viewing angle wider than that in Comparative Example 1.

(Heat Resistance and Moisture Resistance)

The polarizing plate with optical compensation layers of Examples or Comparative Example was allowed to stand under a heated and humidified atmosphere of 60° C./90% RH for 500 hours. Retardation values before and after the heating and humidifying test were measured using a retardation measurement apparatus (KOBLA-31PRW manufactured by Oji Scientific Instruments), and a retardation change amount (%) before and after the heating and humidifying test was obtained from the following equation.

Retardation change amount(%)=[(Retardation value before test−Retardation value after test)/(Retardation value before test)]×100

The following Table 1 shows the measurement results.

TABLE 1

| | Thickness (μm) | Retardation change amount (%) |
|---|---|---|
| Example 1 | 223 | Less than 1 |
| Example 2 | 223 | Less than 1 |
| Comparative example 1 | 330 | 6 |

As is apparent from Table 1, it is confirmed that the retardation change amounts of the polarizing plates with an optical compensation layer of Examples 1 and 2 are smaller than that of the polarizing plate with optical compensation layers of Comparative Example 1. The reason for this is assumed as follows. The TAC support base material is removed from the third optical compensation layer in the polarizing plates with an optical compensation layer of Examples 1 and 2, so a retardation change amount is small without the influence of distortion of the TAC support base material due to heating and humidifying. On the other hand, the retardation change of the polarizing plate with optical compensation layers of Comparative Example 1 becomes large when the TAC support base material is largely distorted due to heating and humidifying.

INDUSTRIAL APPLICABILITY

The polarizing plate with optical compensation layers of the present invention may suitably be used for various image display apparatuses (such as a liquid crystal display apparatus and a self-luminous display apparatus).

The invention claimed is:

1. A polarizing plate with optical compensation layers, comprising:
    a polarizer;
    a first optical compensation layer;
    a second optical compensation layer; and
    a third optical compensation layer, in this order, wherein:
    the first optical compensation layer has a refractive index profile of nx>ny=nz, and an in-plane retardation $Re_1$ of 200 to 300 nm;
    the second optical compensation layer has a refractive index profile of nx>ny=nz, and an in-plane retardation $Re_2$ of 80 to 170 nm; and
    the third optical compensation layer is formed of a material exhibiting an optical negative uniaxial property, and the material is aligned so as to be inclined.

2. A polarizing plate with optical compensation layers according to claim 1, wherein the second optical compensation layer and the third optical compensation layer are attached to each other via only an adhesive layer.

3. A polarizing plate with optical compensation layers according to claim 1, wherein the third optical compensation layer has a thickness of 1 to 10 μm.

4. A polarizing plate with optical compensation layers according to claim 1, wherein the first optical compensation layer and the second optical compensation layer respectively contains a norbornene-based resin and/or a polycarbonate-based resin.

5. A polarizing plate with optical compensation layers according to claim 1, wherein the material exhibiting an optically negative uniaxial property comprises a discotic liquid crystal compound.

6. A polarizing plate with optical compensation layers according to claim 1, wherein the material exhibiting an optically negative uniaxial property for the third optical compensation layer has an average optical axis inclined at an angle of 5° to 50° with respect to a normal line direction of the third optical compensation layer.

7. A liquid crystal panel, comprising:
the polarizing plate with optical compensation layers according to claim 1; and
a liquid crystal cell.

8. A liquid crystal display apparatus, comprising the liquid crystal panel according to claim 7.

9. An image display apparatus, comprising the polarizing plate with optical compensation layers according to claim 1.

10. A production method for a polarizing plate with optical compensation layers, the production method comprising the steps of:
preparing a laminate including an inclined alignment layer in which a material exhibiting an optically negative uniaxial property is aligned so as to be inclined, and a base material;
attaching a second optical compensation layer having a refractive index profile of nx>ny=nz and an in-plane retardation $Re_2$ of 80 to 170 nm to the laminate such that the second optical compensation layer and the inclined alignment layer are adjacent to each other;
peeling the base material, and setting the inclined alignment layer to be a third optical compensation layer;
attaching a first optical compensation layer having a refractive index profile of nx>ny=nz and an in-plane retardation $Re_1$ of 200 to 300 nm; and
attaching a polarizer.

11. A production method according to claim 10, wherein the step of attaching the second optical compensation layer to the laminate includes attaching the second optical compensation layer to the inclined alignment layer with an adhesive strength higher than an adhesive strength between the inclined alignment layer and the base material.

12. A production method according to claim 10, wherein the step of peeling the base material includes immersing the laminate in a water bath.

13. A production method according to claim 12, wherein a temperature of the water bath is 50 to 100° C.

14. A production method according to claim 12, wherein a time period of the immersing is 3 to 30 minutes.

* * * * *